(12) United States Patent
Shih et al.

(10) Patent No.: US 8,542,001 B2
(45) Date of Patent: Sep. 24, 2013

(54) POWER CIRCUIT FOR REDUCING STANDBY POWER CONSUMPTION

(75) Inventors: Tsun-Te Shih, Taipei Hsien (TW); Yu-Yuan Chang, Taipei Hsien (TW); Yi-Hua Wang, Taipei Hsien (TW); Heng-Chia Chang, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 264 days.

(21) Appl. No.: 12/815,970

(22) Filed: Jun. 15, 2010

(65) Prior Publication Data

US 2011/0304312 A1    Dec. 15, 2011

(51) Int. Cl.
*H02M 3/156* (2006.01)
*H02M 3/157* (2006.01)
*H02M 3/158* (2006.01)

(52) U.S. Cl.
USPC .......................... 323/351; 323/266; 323/224

(58) Field of Classification Search
USPC ............... 323/351, 266, 222–225, 282–283, 323/285, 271, 272
See application file for complete search history.

(56) References Cited

U.S. PATENT DOCUMENTS

| 4,816,739 | A  | * | 3/1989 | Sakurai et al. | 323/272 |
| 5,291,119 | A  | * | 3/1994 | Cowett, Jr.    | 323/207 |
| 5,405,092 | A  | * | 4/1995 | Jonninen       | 241/27  |
| 6,400,589 | B2 | * | 6/2002 | Abo et al.     | 363/65  |
| 6,762,595 | B2 | * | 7/2004 | Tamai et al.   | 323/266 |
| 7,218,081 | B2 | * | 5/2007 | Jang et al.    | 323/266 |

\* cited by examiner

*Primary Examiner* — Adolf Berhane
*Assistant Examiner* — Nusrat Quddus
(74) *Attorney, Agent, or Firm* — Muncy, Geissler, Olds & Lowe, PLLC

(57) ABSTRACT

In a power circuit for reducing standby power consumption, a power supply is defined to include a primary power system and a stationary power system. The stationary power system outputs a stationary power after obtaining an input power. A control unit controls ON/OFF of the primary power system, obtains the stationary power as the required power, and receives a PS ON/OFF signal for triggering the control unit, so that the control unit controls the primary power system to supply a primary output power. The power supply includes a switch unit having two ends connected to a power circuit for outputting the stationary power and a virtual load respectively. The PS ON/OFF signal is provided for controlling the switch unit. If the switch unit does not receive the PS ON/OFF signal, it is OFF in a standby mode to avoid unnecessary power consumption of the virtual load.

4 Claims, 3 Drawing Sheets

POWER CIRCUIT FOR REDUCING STANDBY POWER CONSUMPTION

FIELD OF THE INVENTION

The present invention relates to a power circuit for reducing standby power consumption, and more particularly to a power circuit using a PS ON/OFF signal to determine whether or not a virtual load is connected to avoid unnecessary power consumption of the virtual load in a standby mode.

BACKGROUND OF THE INVENTION

In general, present existing power supply used in a computer that supports ATX motherboard architecture, and an improvement of the ATX motherboard architecture on power source lies in that a start button of the computer is not connected to the power supply but connected to the motherboard directly, and the motherboard will wake up the power supply in a standby mode, such that the power supply can supply electric power required for the operation of the computer. Further, the ATX motherboard architecture can achieve a remote ON/OFF function. In conformity with the ATX motherboard architecture, the power supply should supply stationary power to the power supply itself and the motherboard in a standby mode before the computer is booted. If the start button or the remote ON/OFF signal triggers the motherboard, the motherboard will trigger the power supply by a PS ON/OFF signal to supply primary output power for driving the operation of all computer equipment. To achieve this function, the power supply supporting the ATX motherboard architecture includes a stationary power system for supplying the stationary power and a primary power system for supplying the primary output power, such that the power supply can output the stationary power after receiving external electric power.

With reference to FIG. 1 for a more specific operation of the power supply, the power supply comprises a filter unit 11, a rectification unit 12, a stationary power system 2, a power factor correction circuit 3, and a primary power system 4, wherein the filter unit 11 is connected to a power source 8 for obtaining an input power, and the stationary power system 2 receives a filtered and rectified input power and converts the input power into a stationary power 91 to be output. On the other hand, the rectification unit 12 has a rear end connected to the power factor correction circuit 3 to receive the filtered and rectified input power, and the power factor correction circuit 3 improves the power factor of the electric power by changing the waveforms of current and voltage, and the electric power output by the power factor correction circuit 3 is defined as a modulated power that can be input to the primary power system 4 directly and converted into a primary output power 93. However, the power factor correction circuit 3 and the primary power system 4 are driven by a control unit 5 (or both power factor correction circuit 3 and primary power system 4 have an independent control unit), and the control unit 5 includes digital components such as a microcontroller chip or a programmable encoder provided for controlling and driving purposes, and the digital components must obtain a bias voltage before operated. Therefore, the ON or OFF state of the control unit 5 depends on whether or not the stationary power 91 is obtained and whether or not a PS ON/OFF signal 92 is triggered and turned on. If the control unit 5 has not been turned on yet, the power factor correction circuit 3 and the primary power system 4 cannot be turned on, and the primary power system 4 will stop its operation, and only the stationary power system 2 will be operated in the standby mode. If a user presses a start button of the computer host, an electric signal will be generated and transmitted to a motherboard installed in the computer host, and the motherboard will generate and transmit a PS ON/OFF signal 92 to the power supply to trigger the control unit 5. At that time, the control unit 5 requires the stationary power 91 for its start to drive the power factor correction circuit 3 and the primary power system 4 to operate.

However, if there is no load in the stationary power system 2 in the standby mode, in the event that the control unit 5 is started, a load is added to the stationary power system 2 instantaneously. Before the output power of the stationary power system 2 is modulated, the voltage obtained by the control unit 5 is too low, and the control unit 5 may not be able to start. To assure normal starts of all digital components that require the stationary power 91 for their operation, the stationary power system 2 has an output end connected to a virtual load 6, and the virtual load 6 normally increases the current of the stationary power system 2, such that the voltage drop caused by the start of the control unit 5 will not affect the start of the control unit 5. The normally connected virtual load 6 will incur normal power losses. Therefore, power supply manufacturers tend to develop energy-saving products and the power supplies require an "80PLUS" certification, which is divided into different ranks such as gold, silver, and bronze. Obviously, it is necessary to overcome the normal power consumption of the virtual load 6 to achieve energy saving purpose.

SUMMARY OF THE INVENTION

Since the conventional power supply requires a virtual load to assure a successful starts of the control unit and primary power system, but it also has a drawback of normally incurring power losses.

Therefore, the primary objective of the present invention is to overcome the power consumption issue of the virtual load to assure the successful starts of the control unit and primary power system.

To achieve the foregoing objective, the present invention provides a power circuit for reducing standby power consumption, and a power supply is defined and includes a primary power system and a stationary power system, wherein a stationary power system receives an input power and outputs a stationary power. A control unit is provided for controlling whether or not to operate the primary power system, and the control unit must be connected to an output end of the stationary power system to obtain the stationary power for the required power, and the control unit requires to receive a PS ON/OFF signal before it is triggered and turned on. After the control unit is turned on, the primary power system can be controlled to supply a primary output power. The power supply further comprises a switch unit, wherein the switch unit has two ends connected to a power circuit for outputting the stationary power and a virtual load respectively, and the PS ON/OFF signal is provided for controlling whether or not to turn on the switch unit. If the switch unit is OFF, the power source in a standby mode is not triggered by the PS ON/OFF signal. If the switch unit is triggered by the PS ON/OFF signal and turned on, then the virtual load will be electrically connected to the stationary power system.

Therefore, when the power supply is in a standby mode (the computer host is turned off), the switch unit is cut off so that the stationary power system and the virtual load are considered to be independent and disconnected with each other, and the virtual load will not incur any power loss. If the computer host is turned on (or the power supply is turned on completely), the switch unit is ON such that the virtual load is electrically connected to the stationary power system to achieve the purpose of assuring a sufficient voltage for starting the controller. For shutdown again, the switch unit is off again to separate the virtual load from the stationary power system to achieve energy saving purpose.

DETAILED DESCRIPTION OF THE PREFERRED EMBODIMENTS

The technical contents of the invention will now be described in more detail hereinafter with reference to the accompanying drawings that show various embodiments of the invention.

Figure 1:
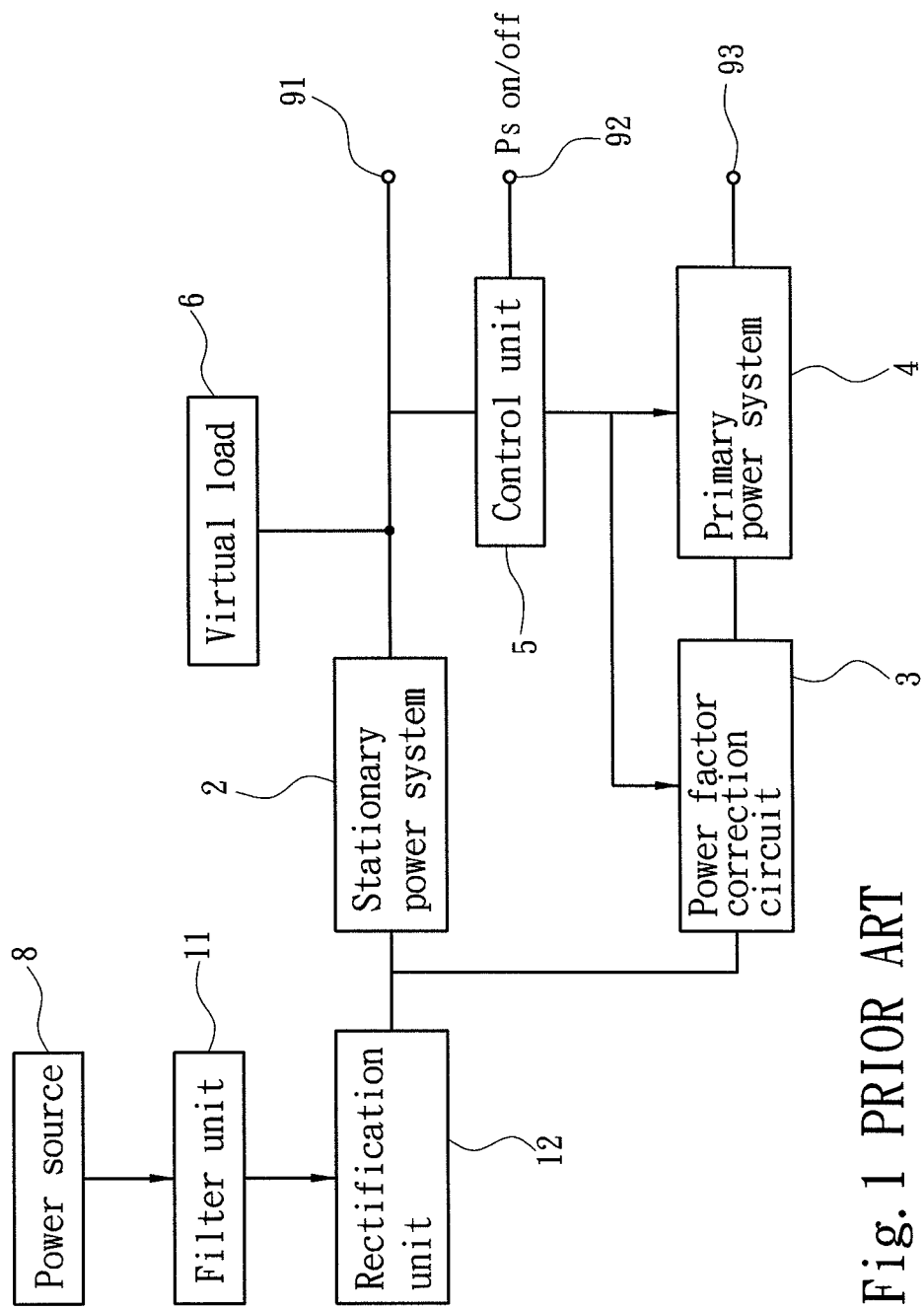
FIG. 1 is a schematic view of a conventional circuit.
Figure 2:
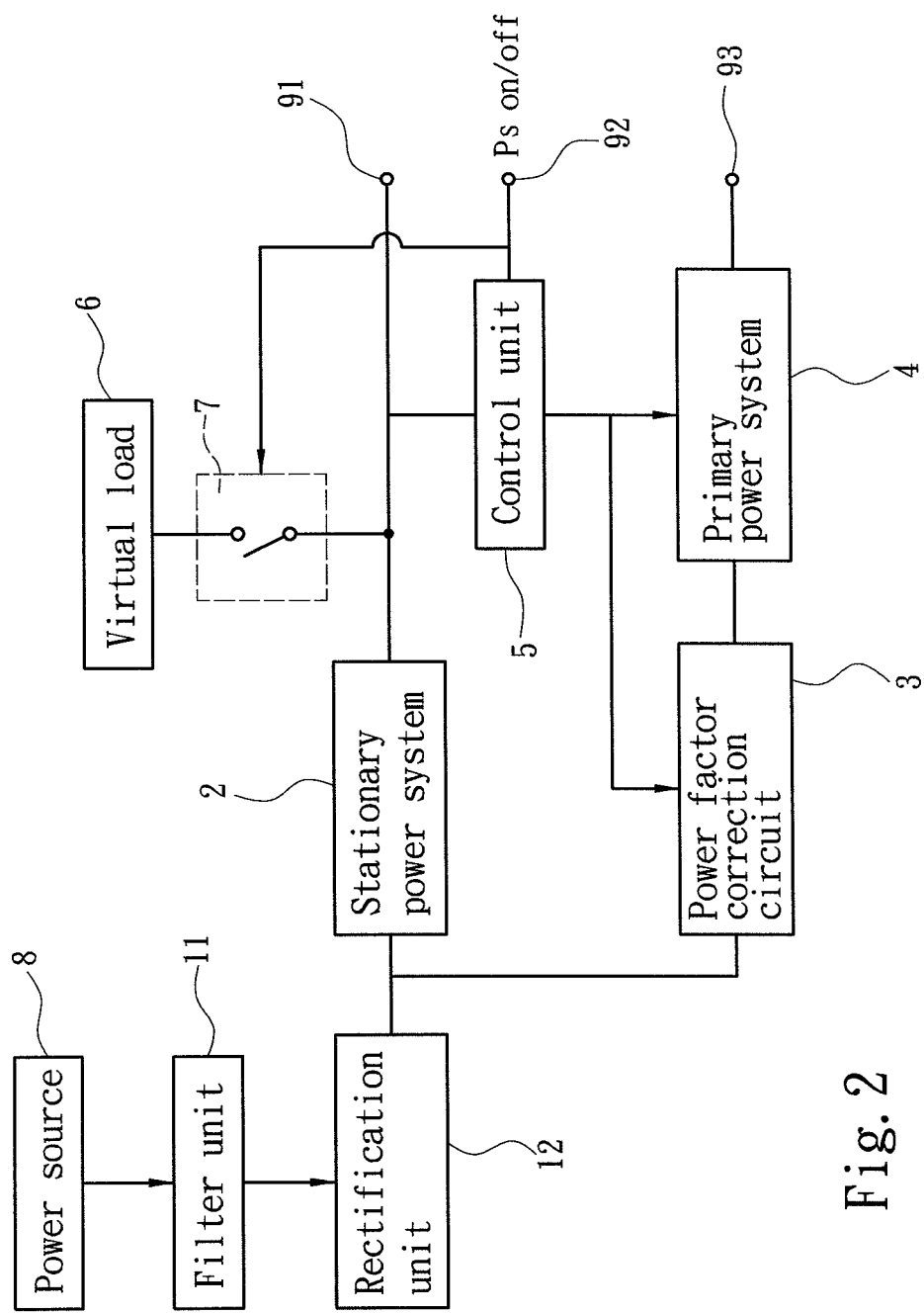
FIG. 2 is a schematic view of a circuit architecture of the present invention.

With reference to FIG. 2 for a power circuit for reducing standby power consumption in accordance with the present invention, the power circuit is used in a power supply that supports ATX motherboard architecture, and the power supply comprises a filter unit 11, a rectification unit 12, a stationary power system 2, a power factor correction circuit 3, a primary power system 4 and a control unit 5. The filter unit 11 is connected to a power source 8 to obtain and filter an input power, and the filtered input power is passed through the rectification unit 12 to be converted into DC current. The stationary power system 2 obtains the rectified input power and normally modulates the input power into a stationary power 91 to be supplied to the power supply and a motherboard in a computer (not shown in the drawings) driven by the power supply in a standby mode. The stationary power system 2 can also receive a remote ON/OFF instruction to turn on the motherboard in a computer (not shown in the drawings) and computer equipment (not shown in the drawings) connected to the power supply into a working mode. The power supply further comprises a plurality of digital components (such as integrated circuits) that require the stationary power 91 to supply a bias voltage, wherein those components requiring the stationary power 91 to supply the bias voltage include the control unit 5 used for controlling the primary power system 4 and/or the power factor correction circuit 3, or the power factor correction circuit 3 includes an independent control circuit, but it is not a key point of the present invention that the power factor correction circuit 3 is controlled independently. Regardless of the power factor correction circuit 3 has the independent control circuit, the power factor correction circuit 3 is still applicable for the present invention.

With reference to FIG. 2 for an embodiment of the present invention, the control unit 5 is electrically connected with the primary power system 4 and the power factor correction circuit 3. The power factor correction circuit 3 is connected to a rear end of the rectification unit 12 to obtain the DC power, and improves the power factor of the electric power by changing waveforms of current and voltage. The electric power output by the power factor correction circuit 3 is defined as a modulated power to be supplied into the primary power system 4 directly for being converted into a primary output power 93. However, if the power supply and the motherboard in the computer are in a standby mode, the control unit 5 is not turned on, so that the power factor correction circuit 3 and the primary power system 4 cannot be operated to generate the primary output power 93 required for the operation of the motherboard (not shown in the drawings) and other computer equipment (not shown in the drawings). After a start button of a computer is pressed to generate an electric signal to trigger the motherboard (not shown in the drawings), the motherboard (not shown in the drawings) will generate a PS ON/OFF signal 92. The control unit 5 is turned on only if it obtains the stationary power 91 and is triggered by the PS ON/OFF signal 92, and the control unit 5 further drives the power factor correction circuit 3 and the primary power system 4 to operate, and the primary output power 93 output by the primary power system 4 will drive computer equipment to operate. To assure sufficient voltage for turning on the control unit 5, the stationary power system 2 is connected to a switch unit 7, wherein the switch unit 7 has two ends connected to a power circuit for outputting the stationary power 91 and a virtual load 6 respectively, and the PS ON/OFF signal 92 is provided for determining whether or not the switch unit 7 is turned on. The switch unit 7 is OFF when it is not triggered by the PS ON/OFF signal 92 (or in a standby mode). The switch unit 7 is turned on when it is triggered by the PS ON/OFF signal 92, then the stationary power system 2 is electrically connected to the virtual load 6. Therefore, when the power supply is in a standby mode (the computer host is turned OFF), the switch unit 7 is cut off, and the stationary power system 2 and the virtual load 6 are considered to be independent and disconnected with each other, so that the virtual load 6 will incur no power loss. When the computer host is powered on (or the power supply is turned on completely), the switch unit 7 is ON to electrically connect the virtual load 6 to the stationary power system 2 to assure sufficient voltage for turning on the control unit 5. If the computer host is rebooted, the switch unit 7 will be OFF again to separate the virtual load 6 from the stationary power system 2, so as to achieve energy saving purpose.

Figure 3:
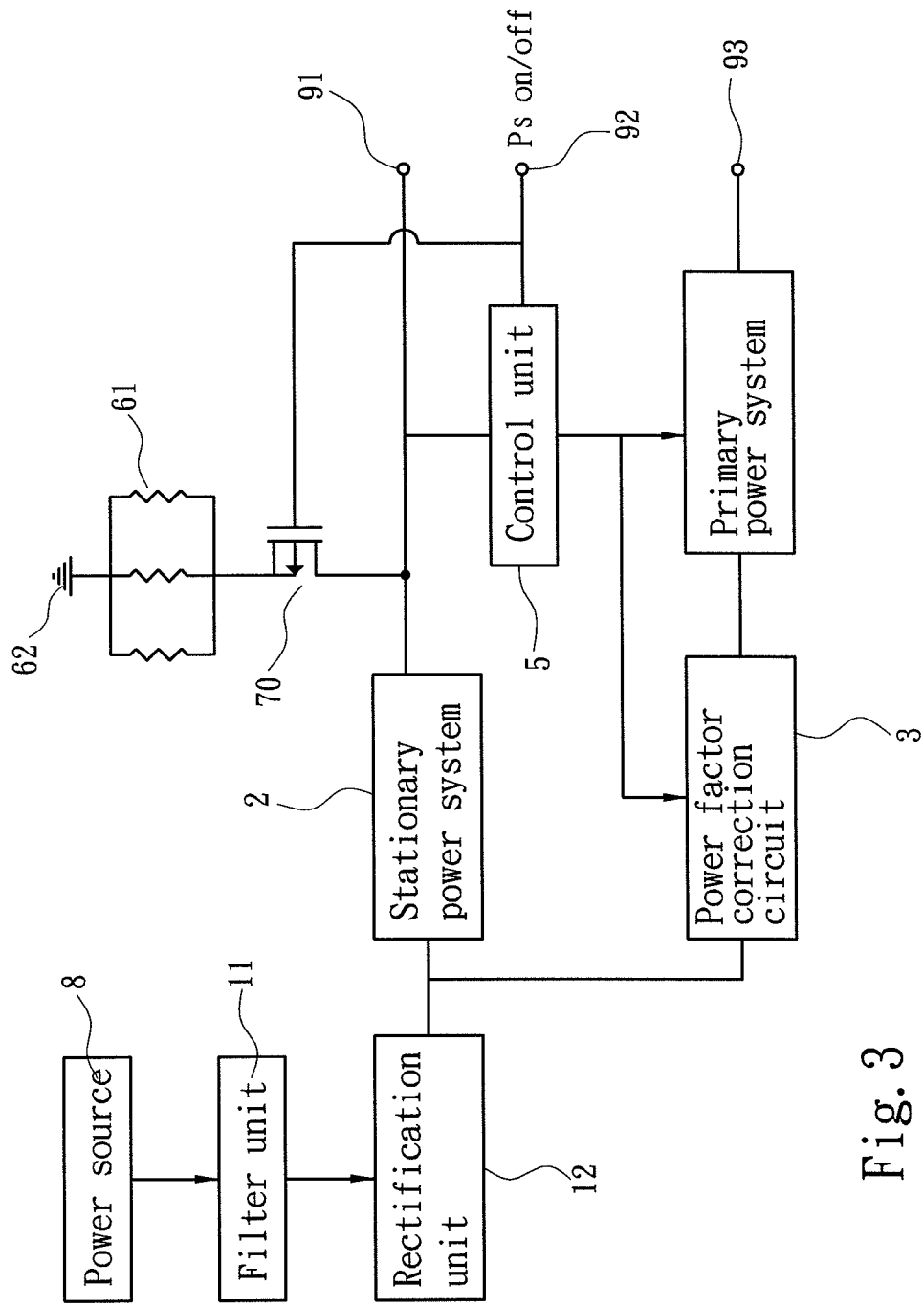
FIG. 3 is a schematic view of a switch unit and a virtual load in accordance with an embodiment of the present invention.

With reference to FIG. 3 for an embodiment of the virtual load 6 and the switch unit 7 in accordance with the present invention, a power circuit of the stationary power system 2 provided for outputting the stationary power 91 is connected to a metal oxide semiconductor field effect transistor (MOSFET) 70, and the MOSFET 70 includes a drain and a source respectively connected to the power circuit for outputting the stationary power 91 and the virtual load 6. The virtual load 6 includes a plurality of resistors 61 connected in parallel to form a resistive load, and the resistors 61 are connected to a ground point 62. If a gate of the MOSFET 70 receives the PS ON/OFF signal 92, and the PS ON/OFF signal 92 triggers the control unit 5 to be turned on, the MOSFET 70 is ON synchronously. On the other hand, if the control unit 5 is turned off, and the MOSFET 70 is OFF synchronously. Therefore, the present invention can assure that the virtual load 6 will not incur any power loss when the power supply is in the standby mode, so as to achieve energy saving effect.

In summation of the description above, the present invention improves over the prior art and complies with the patent application requirements, and thus is duly filed for patent application. While the invention has been described by means of specific embodiments, numerous modifications and variations could be made thereto by those skilled in the art without departing from the scope and spirit of the invention set forth in the claims.

What is claimed is:
1. A power supply for reducing standby power consumption, comprising:
a primary power system;

a stationary power system, the stationary power system outputting a stationary power for the power supply in a standby mode;

a control unit obtaining the stationary power and being triggered by a power supply (PS) ON/OFF signal to drive the primary power system to output a primary output power, a switch unit including two ends, a first end being connected to the stationary power system for outputting the stationary power and a second end connected to a virtual load, the virtual load including two ends, with a first end connected to the switch unit and a second end connected to a ground point;

wherein the PS ON/OFF signal is provided for controlling the ON/OFF of the switch unit, such that the switch unit is turned off in the standby mode when not triggered by the PS ON/OFF signal, and the switch unit is turned on when triggered by the PS ON/OFF signal and then the stationary power system is electrically connected to the virtual load.

2. The power circuit for reducing standby power consumption as recited in claim 1, wherein the virtual load is a resistive load.

3. The power circuit for reducing standby power consumption as recited in claim 2, wherein the virtual load includes a plurality of resistors connected in parallel.

4. The power circuit for reducing standby power consumption as recited in claim 1, wherein the switch unit is a metal oxide semiconductor field effect transistor (MOSFET).

* * * * *